UNITED STATES PATENT OFFICE.

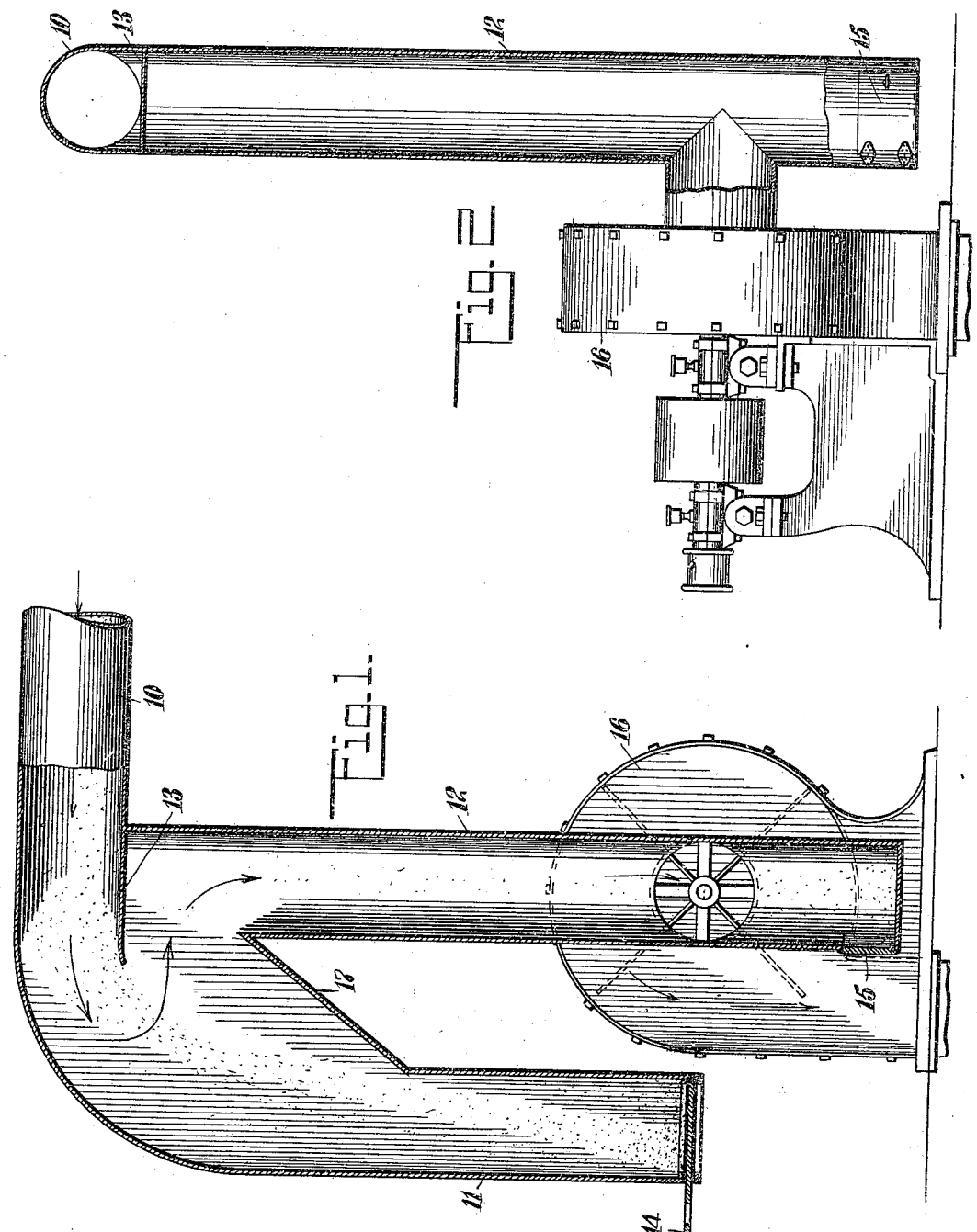

FREDERICK BENNARD CUMPSTON, OF DALLAS, TEXAS.

APPARATUS FOR REMOVING SAND OR OTHER FINE PARTICLES FROM COTTON OR OTHER MATERIAL.

952,880.  Specification of Letters Patent.  Patented Mar. 22, 1910.

Application filed August 10, 1909. Serial No. 512,181.

*To all whom it may concern:*

Be it known that I, FREDERICK B. CUMPSTON, a citizen of the United States, and a resident of Dallas, in the county of Dallas and State of Texas, have invented a new and Improved Apparatus for Removing Sand or other Fine Particles from Cotton or other Material, of which the following is a full, clear, and exact description.

The invention is an improvement in apparatus for removing sand or other fine particles from cotton or other material by air suction, and has in view an effective means to separate the particles from the inflowing current of air before the latter reaches the suction fan or air pump. To this end I provide an inlet conduit for the air and sand with two approximately vertical arms, each having a normally closed outlet for the particles, the conduit directly discharging into one of said arms and indirectly communicating with the other arm through the side, the last-named arm connecting above its particle outlet through the side with the exhaust fan or pump.

Reference is to be had to the accompanying drawings forming a part of this specification, in which similar characters of reference indicate corresponding parts in both views.

Figure 1 is a side view of an apparatus embodying my invention, partly in vertical section; and Fig. 2 is an elevation of the apparatus at right-angles to the position shown in Fig. 1, and also partly in vertical section.

The apparatus in its more specific nature embodies a substantially horizontal inlet conduit 10 which leads from a point where the sand or other particles are screened from the cotton or other material, the conduit merging into two approximately vertical arms 11 and 12, the bottom wall of the conduit 10 overhanging the upper end of the arm 12, as indicated at 13, and discharging directly into the arm 11, the conduit indirectly connecting with the arm 12 through the side of the latter, as clearly shown in Fig. 1. The lower portions of both the arms 11 and 12 are in the nature of a trap, with the arm 11 normally closed by a transversely sliding door or valve 14, and the arm 12 permanently closed at the bottom and provided with a door 15 at the side, through the opening of which the trap can be cleaned out. A substantial distance above the door 15 the arm connects through the side with an exhaust fan or air pump 16, under the influence of which the sand or other particles are drawn with the air through the conduit 10. In order to further insure the passage of the major portion of the particles from the conduit into the arm 11, a chute 17 inclines downwardly from the base of the inlet opening of the arm 12 to the adjacent wall of the arm 11.

In the operation of the apparatus the exhaust fan draws in the air with the sand, which it screens from the cotton or other material to the conduit 10, the sand passing over the bottom wall of the conduit covering the arm 12 and dropping either directly into the arm 11 or by first falling on the chute 17. The air will be drawn through the inlet of the arm 12 and pass out through the fan. A small quantity of the sand or particles, especially the finer portions, will be drawn by the air into the arm 12 and will fall into the trap of this arm, where they can be easily cleaned out through the door 15. The discharge of the sand through the arm 11 is obviously performed by sliding out the door 14. With the apparatus thus constructed, substantially none of the sand passes through the exhaust fan, and as a consequence the bearings in this part of the machine are preserved.

Having thus described my invention, I claim as new and desire to secure by Letters Patent:

1. In an apparatus for separating relatively fine particles from a material, an inlet conduit for the air and said particles, having an approximately vertical arm provided with a normally closed outlet for the particles at the lower end thereof, and an air pump to draw the air through the conduit and connecting at the side of the said vertical arm above the said outlet, with the arm, pump and the connection of the pump with the arm arranged to prevent the passage of the said particles within the pump.

2. In an apparatus for separating relatively fine particles from a material, an inlet conduit for the air and the said particles having two approximately vertical arms, with the conduit discharging directly into one of said arms and indirectly into the other arm through the first-mentioned arm, and an exhaust fan for drawing the air and particles through the conduit, having a connection at the side of the indirectly-connected arm at a substantial distance below the latter's connection with the directly-connected arm and at a substantial distance above the lower end of the indirectly-connected arm.

3. In an apparatus for separating relatively fine particles from a material, an inlet conduit for the air and the said particles, having two approximately vertical arms, each having a normally closed outlet for said particles, and an exhaust fan for drawing the air and particles through the conduit, connected to one of said arms above the said outlet.

4. In an apparatus for separating relatively fine particles from a material, an inlet conduit for the air and the said particles, having two approximately vertical arms, the conduit discharging directly into one of said arms and communicating with the other arm through the side thereof, each of said arms having a normally closed outlet for the particles, and an air pump to draw the air and the particles from the conduit having a connection with the arm with which the conduit indirectly connects, the said connection being arranged at the side of the arm above its outlet for the particles.

5. In an apparatus for separating relatively fine particles from a material, an inlet conduit for the air and the said particles, having two approximately vertical arms each having a trap for said particles at the lower portion thereof, said conduit having its bottom wall directed to one of said arms and overlying the other arm, the conduit communicating with the last mentioned arm under said wall, and an exhaust fan to draw the air and the particles from the conduit, having a connection with the last mentioned arm arranged at the side thereof above its trap.

In testimony whereof I have signed my name to this specification in the presence of two subscribing witnesses.

FREDERICK BENNARD CUMPSTON.

Witnesses:
J. D. McCLANAHAN, Jr.,
G. E. RAMSEY.